No. 12,440. REISSUED JAN. 30, 1906.

W. J. BOWERMAN.

SHOOTING GALLERY.

APPLICATION FILED DEC. 5, 1905.

Witnesses:

Alex. Scott

G. E. Garrett

Inventor:

William J. Bowerman,

By James Whittemore,

Atty.

UNITED STATES PATENT OFFICE.

WILLIAM J. BOWERMAN, OF DETROIT, MICHIGAN.

SHOOTING-GALLERY.

No. 12,440. Specification of Reissued Letters Patent. Reissued Jan. 30, 1906.

Original No. 801,844, dated October 17, 1905. Application for reissue filed December 5, 1905. Serial No. 290,492.

*To all whom it may concern:*

Be it known that I, WILLIAM J. BOWERMAN, a citizen of the United States, residing at Detroit, in the county of Wayne and State of Michigan, have invented certain new and useful Improvements in Shooting-Galleries, of which the following is a specification, reference being had therein to the accompanying drawings.

The invention has reference generally to shooting-galleries provided with targets controlled in their operation by coin-controlled mechanism; and the invention consists in the novel construction of the controlling means and in the peculiar arrangement and combination of the various parts thereof, as will be more fully hereinafter set forth.

Figure 2:
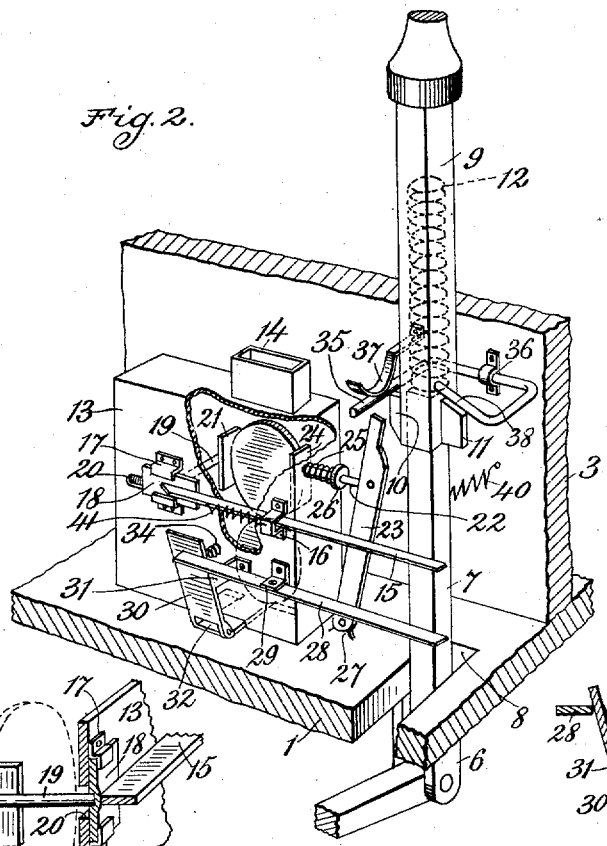
Figure 4:
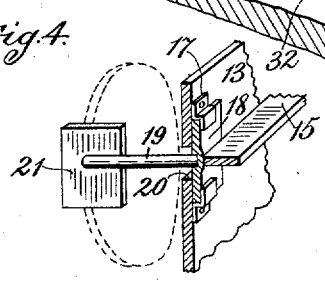
Figure 5:
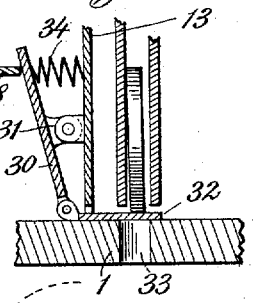
Figure 3:
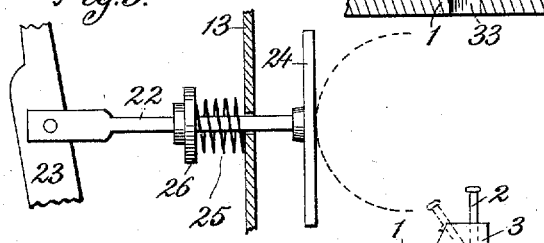
Figure 1:
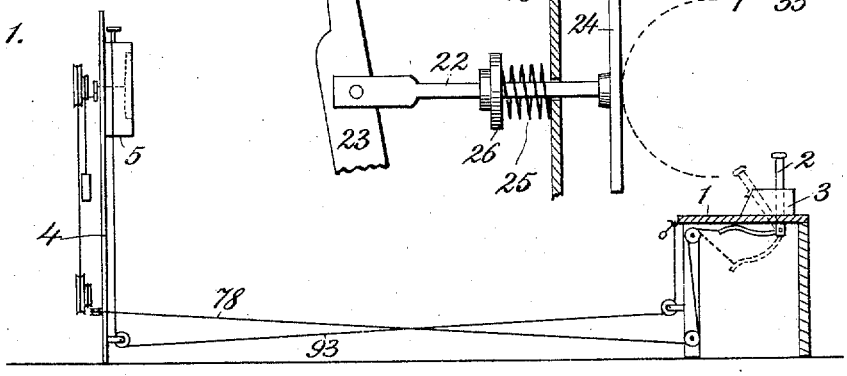

In the drawings illustrating my invention, Figure 1 is a general view of the apparatus in side elevation. Fig. 2 is a sectional perspective view of the coin-controlled mechanism, and Figs. 3, 4, and 5 are enlarged sectional detail views of parts of the controlling means.

Generally described, a counter 1 is arranged at the end of the gallery where the person stands to shoot, and on this counter is located an actuating device, preferably a lever 2, for operating the target or targets, and within a casing 3 on the counter is the coin-controlled mechanism controlling the operation of the lever or such other starting device as may be employed. At the opposite end of the gallery is a mask plate or wall 4, to the front of which is secured a casing 5, inclosing the target to be shot at.

The operating-lever is preferably in the form of a bell-crank pivoted for rocking movement in ears 6, depending from the counter-top. The vertical section of this lever is made in two parts—a lower section or member 7, which is preferably square in cross-section and is adapted to work in a slot 8 in the counter, and an upper telescopic section 9. The upper section carries at its lower end two laterally-projecting ears or lugs 10 and 11 and has housed within its interior a spiral spring 12, which abuts against the lower section and tends to hold the upper section at the limit of its upward travel.

Within the casing described is a coin-housing 13, having a coin-chute 14 at its top, which extends to the casing-top and registers with a suitable slot therein. A bar 15 is mounted in brackets 16 and 17 in the housing 13 for endwise-sliding movement and is of a length to project in the path of the operating-lever, as plainly shown in Fig. 2. At its inner end this sliding bar carries fixed thereto a plate 18, and to this plate is rigidly attached a pin 19, projecting through a slot 20 in the housing and carrying at its extremity a coin-plate 21.

22 is a pin similar to 19, extending through the side of the coin casing or housing and adapted to be reciprocated by a lever 23. This pin carries at its inner end within the housing a plate 24, corresponding to the plate 21, which is normally spaced therefrom by a coil-spring 25, that encircles the pin 22 and abuts against the housing and a collar 26 on said pin. The lever 23 is pivoted to the pin 22 at its upper end and is pivoted at its lower end to a bracket 27 on the counter.

28 is a bar pivoted to the bracket 29 upon the front of the coin-case, one end of which projects in the path of the operating-lever, while the inner end bears against a bar or plate 30. This latter bar is pivoted centrally to brackets 31 on the coin-case and at its lower end to a bar 32, extending within the coin-case and across the coin-slot 33, formed in the counter. A spring 34 is interposed between the upper end of the bar or plate 30 and the casing and serves to maintain the bar 32 across the slot 33 to support the coin.

35 is a locking-pin pivoted in a bracket 36, and 37 is a spring bearing against said pin and tending to throw the free end thereof into engagement with the upper end of the lever 23.

38 is an arm carried by the locking-pin 35, adapted to be engaged at certain periods by the lug 11 on the operating-lever.

In the type of coin-controlled mechanism described a coin rests normally upon the support 32, which covers the slot 33. Upon the insertion of a coin by the operator within the coin-chute 14 it falls upon the lower coin and is supported thereon between the coin-plates 21 and 24. By then depressing the telescoping section of the operating-lever the lever 23 is moved forwardly by the lug 10, and through the agency of the coin between the coin-plates the bar 15 is withdrawn from the path of the operating-lever. Upon the advancement of the lever 23 the stop-pin 35 is thrown downwardly in engagement with said lever and locks the parts, so that the coin inserted by the operator will be held clamped between the plates until the lever is returned to its initial position. The operating-lever is then rocked on its pivot and the target used in connection with the controlling means is set or otherwise operated through the agency of a suitable cable 78 and sheaves over which the cable passes. Where indicating mechanism is used in connection with the target, the indicators may be reset by a suitable cable 93. Before the lever reaches the limit of its rocking movement it strikes against and operates the lever 28, withdrawing the support from beneath the lower coin and allowing the latter to drop through the chute into a suitable receptacle. (Not shown.) The operating-lever is then released and is returned to its initial position by the spring 40, while simultaneously therewith the telescoping section of the lever is raised to its initial position by the coil-spring 12. Upon the return movement of the operating-lever the spring 34 returns the coin-support 32 across the slot, the lug 10 upon the lever passes out of engagement with the lever 23, the stop 35 is raised by the lug 11 operating the arm 38, and a spring 41, connected to the bar 15 and the coin casing or housing, returns said bar to its initial position in the path of the operating-lever, and the latter is again locked against rocking movement until another coin is inserted.

The target I preferably employ in connection with the controlling means previously described is only generally referred to herein, as its particular construction and manner of operation form the subject of another and pending application.

What I claim as my invention is—

1. In a coin-controlled machine of the character described, a laterally-movable sectional operating-lever, means for retaining said lever in upright position, including a movable bar, and means whereby one section may be moved relative to the other and actuate said retaining means to remove the same from the path of the lever, upon the insertion of a coin.

2. In a coin-controlled machine of the character described, an operating-lever pivoted for rocking movement, comprising sections slidable upon one another, means for normally retaining said lever in a stationary position, and means whereby one of said sections may slide and actuate said retaining means to move the same out of the path of the lever upon the insertion of a coin.

3. In a coin-controlled machine of the character described, an operating-lever pivoted at its lower end for rocking movement comprising sections slidable upon one another, means arranged intermediate the ends of the lever for normally retaining the same in upright position, means whereby one of said sections may be slid, means on said slidable section operatively associated with the retaining means to actuate and release the same upon the insertion of a coin, and resilient means for retaining said sections in normal position.

4. In a coin-controlled machine of the character described, an operating-lever comprising an inner section and an outer section having a slidable telescoping connection therewith, a lug on the outer section, a lock for retaining said lever from movement, and releasing means actuated by said lug and operatively associated with said locking means for releasing the lever upon the insertion of a coin.

5. In a coin-controlled machine, the combination of an operating-lever comprising an inner section and an outer section having a slidable telescoping connection therewith, a lock for retaining the said lever from movement, and means operatively associated with the outer section for moving said locking means out of the path of the lever upon the insertion of a coin.

6. In a coin-controlled machine, the combination of an operating-lever comprising an inner section and an outer section having a slidable telescoping connection therewith, a lock for retaining said lever from movement, means operatively associated with the outer section for moving said locking means out of the path of the lever upon the insertion of a coin, and means for retaining said sections in extended position.

In testimony whereof I affix my signature in presence of two witnesses.

WILLIAM J. BOWERMAN.

Witnesses:
H. C. SMITH,
JAS. P. BARRY.